US007953861B2

(12) United States Patent
Yardley

(10) Patent No.: US 7,953,861 B2
(45) Date of Patent: May 31, 2011

(54) MANAGING SESSION STATE FOR WEB APPLICATIONS

(75) Inventor: Brent W. Yardley, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 843 days.

(21) Appl. No.: 11/463,830

(22) Filed: Aug. 10, 2006

(65) Prior Publication Data
US 2008/0040484 A1 Feb. 14, 2008

(51) Int. Cl.
G06F 15/16 (2006.01)
(52) U.S. Cl. .......................... 709/227; 709/203; 709/228
(58) Field of Classification Search .................. 709/203, 709/217, 227, 228
See application file for complete search history.

(56) References Cited

U.S. PATENT DOCUMENTS

| 6,199,065 | B1 | | 3/2001 | Kenyon |
| 6,701,345 | B1 | * | 3/2004 | Carley et al. .................. 709/205 |
| 6,701,367 | B1 | * | 3/2004 | Belkin .......................... 709/227 |
| 7,171,410 | B1 | * | 1/2007 | Neufeld et al. .................. 707/8 |
| 7,433,956 | B2 | * | 10/2008 | Zhao et al. .................... 709/228 |
| 2002/0147652 | A1 | | 10/2002 | Gheith et al. |
| 2002/0152423 | A1 | * | 10/2002 | McCabe ........................ 714/15 |
| 2002/0194262 | A1 | * | 12/2002 | Jorgenson .................... 709/203 |
| 2003/0084165 | A1 | * | 5/2003 | Kjellberg et al. ............. 709/227 |
| 2004/0015600 | A1 | * | 1/2004 | Tiwary et al. ................ 709/234 |
| 2004/0039827 | A1 | | 2/2004 | Thomas et al. |
| 2004/0068572 | A1 | | 4/2004 | Wu |
| 2004/0143669 | A1 | * | 7/2004 | Zhao et al. .................... 709/228 |
| 2004/0193600 | A1 | | 9/2004 | Kaasten et al. |
| 2005/0038801 | A1 | * | 2/2005 | Colrain et al. ................ 707/100 |
| 2005/0198380 | A1 | * | 9/2005 | Panasyuk et al. ............. 709/239 |
| 2006/0230124 | A1 | * | 10/2006 | Belfiore et al. ............... 709/219 |
| 2007/0156897 | A1 | * | 7/2007 | Lim .............................. 709/225 |
| 2008/0286741 | A1 | * | 11/2008 | Call ............................. 434/350 |

FOREIGN PATENT DOCUMENTS

CN 1717676 A 4/2004
WO WO2004034192 A2 4/2004

OTHER PUBLICATIONS

J. Lam et al., "Architecting Your Web Applications," 1999 Microsoft Internet Developer, pp. 1-10.
The J2EE Tutorial, "Maintaining Client State," downloaded from the Internet {<http://www.java.sun.com/j2ee/1.4/tutorial/doc/Servlets11.html>} Aug. 9, 2006, 2 pages.
"Introduction to Web Forms State Management," download from the Internet {<http://msdn.microsoft.com/library/default.asp?url=library/en-us/vbcon/html/vbconIntroductionToWebFormsStateManagement.asp?frame=true&hidetoc=true>} on Aug. 9, 2006, 5 pages.

* cited by examiner

Primary Examiner — Phuoc Nguyen
(74) Attorney, Agent, or Firm — Walter W. Duft

(57) ABSTRACT

A technique for managing the session state of a web application during transaction processing. When a message is exchanged between a web client and a web server, such as a web client request or a web server response, session information therein is stored on behalf of the client. Following an interruption in session state, the session state may be recreated by using the stored session information.

29 Claims, 6 Drawing Sheets

MANAGING SESSION STATE FOR WEB APPLICATIONS

BACKGROUND OF THE INVENTION

1. Field of the Invention

The present invention relates to web-based network transaction processing. More particularly, the invention is directed to techniques for preserving session state in a web application transaction.

2. Description of the Prior Art

By way of background, the use of web applications for conducting remote electronic transactions has become pervasive. A web application is a software program that allows a user to interact with a remote service using web page forms delivered by a web server and displayed to the user via a web client (e.g. a web browser). Although the term "web" is short for "World Wide Web" (a portion of the global Internet), web applications are not limited to public networks, and may be used in private networks or even between non-network connected machines. The types of transactions that may be implemented using web applications are many and varied. Examples include online purchasing, trading, banking and other forms of commerce. Web applications have also been utilized to implement user interfaces for hardware and software services, such as storage and database management systems.

In conventional web-based applications, especially those that deal with secure (e.g., banking) information, there are session timeouts that terminate user interaction with the application for security reasons if the timeouts are triggered. When this occurs, the user has to log back into the interface and start from the beginning of the transaction. Session state will likewise be lost if the session is disrupted due to network errors, equipment failures or the like. Current web applications also provide no mechanism whereby a user can voluntarily interrupt a session while saving session state. For example, when a user logs on to a financial institution website to make an online bill payment, the user must complete the transaction before logging off. The user is not allowed to save the current state of the transaction, logoff and then at some later date, log back into the system and continue with the transaction from the saved point.

It would be desirable to provide a technique whereby the session state of a web application can be preserved notwithstanding interruptions in transaction processing. What is particularly needed is the capability for web application users to control session state, so that a session can be paused and later resumed according to user requirements.

SUMMARY OF THE INVENTION

The foregoing problems are solved and an advance in the art is obtained by a novel method, system and computer program product for managing the session state of a web application during transaction processing. When a message is exchanged between a web client and a web server, such as a web client request or a web server response, session information therein is stored on behalf of the client. Following an interruption in session state, the session state may be recreated by using the stored session information.

According to exemplary illustrated embodiments, the message may comprise one of an encrypted web client request message, a non-encrypted web client message, an encrypted web server response message or a non-encrypted web server response message. The session information may comprise the entire message, or a portion thereof. In either case, the session information may be stored in association with a session identifier. The session information data may be stored in a cache while the session state remains uninterrupted, and in persistent storage when the session state is interrupted. The persistent storage may comprise a server-side file system storage, a client-side file system storage, or a database storage. In a further aspect, the client may be given the option to initiate storage of the session information when the client voluntarily terminates the session state.

In one exemplary implementation, session state management functions are part of a web server system product that provides a web application while managing the session state of the web application during transaction processing. When a request is received from a client that contains session information for generating a web page, the web server system stores the session information on behalf of the client. Following an interruption in session state, the session state may be recreated by using the stored session information to generate the web page.

In another exemplary implementation, the session state management functions are part of a middleware product that supports a web server system in providing a web application while managing the session state of the web application during transaction processing. When the middleware product receives a request from a client that contains session information for generating a web page, the submission is passed to the web server system and the session state information is stored on behalf of the client. Following an interruption in session state, the session state may be recreated by providing the stored session information to the web server in order to generate the web page.

BRIEF DESCRIPTION OF THE DRAWINGS

The foregoing and other features and advantages of the invention will be apparent from the following more particular description of preferred embodiments of the invention, as illustrated in the accompanying Drawings, in which.

DETAILED DESCRIPTION OF THE PREFERRED EMBODIMENTS

Figure 1:
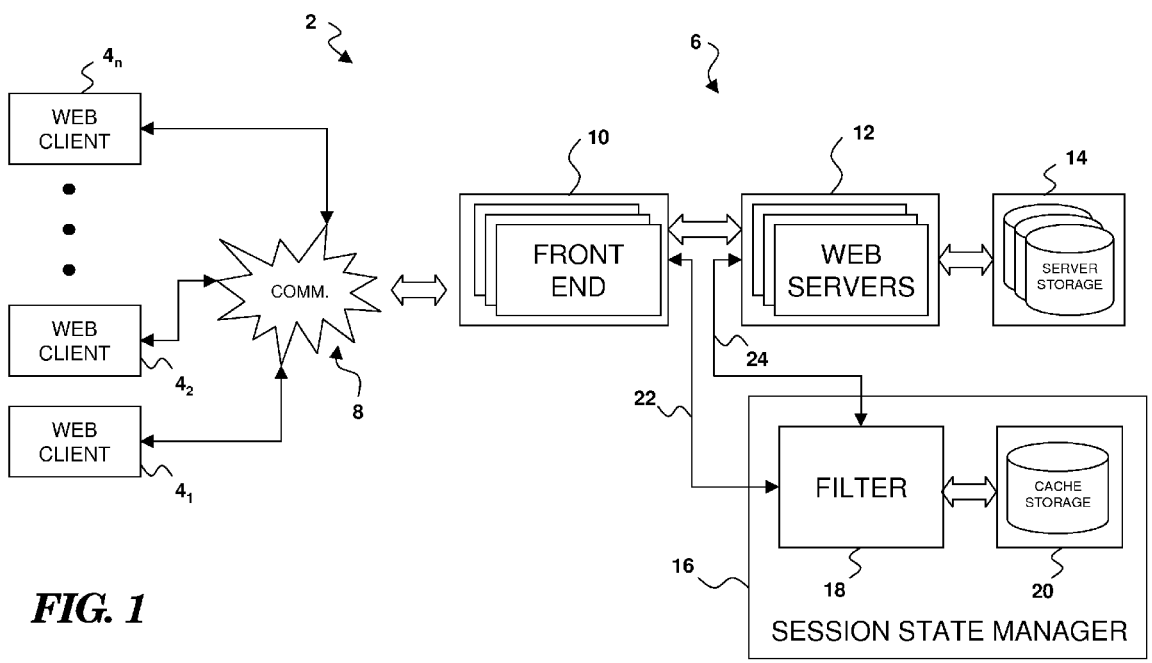
FIG. 1 is a functional block diagram showing an exemplary web transaction environment that includes a web application session state manager.

The invention will now be described by way of exemplary embodiments shown by the drawing figures, in which like reference numerals indicate like elements in all of the several views. Turning to FIG. 1, an exemplary web transaction environment 2 is shown wherein one or more web application clients (web clients) $4_1, 4_2 \ldots 4_n$ communicate with a web application server system (web server system) 6 over a communication medium 8. The web clients $4_1, 4_2 \ldots 4_n$ may be individually embodied in any type of device, system or appliance capable of implementing the web client logic needed to interact with the web server system 6. By way of example only, an exemplary web client $4_1, 4_2 \ldots 4_n$ might comprise a web browser program running on a personal desktop computer, a laptop computer, a cellular telephone or other handheld device, a web appliance or other embedded system, etc.

The web server system 6 may be implemented using conventional web server program logic executing in one or more instances on one or more data processing platforms. In FIG. 1, the web server system 6 is shown by way of example only as a server farm capable of large-scale web transaction processing. According to this exemplary implementation, the web server system 6 may comprise one or more front end query distributor instances (query distributors) 10, one or more back-end web server instances (web servers) 12, and one or more instances of server storage 14. As is known in the art, the function of the query distributors 10 is to receive client requests from the web clients $4_1, 4_2 \ldots 4_n$ and distribute them to the web servers 12 in a manner that achieves equitable web server load balancing. The web servers 12 process the client requests and generate responsive web pages for return to the clients $4_1, 4_2 \ldots 4_n$ via the query distributors 10. This processing includes the retrieval of static web pages that may be stored in the server storage 14 and common gateway interface (CGI) processing whereby the web servers 12 invoke external helper applications to assist in creating dynamic web page content. The server storage 14 stores static web pages, and may additionally store other information such as data for constructing dynamic web pages, as well as execution and data files associated with the front end query distributors 10, the web servers 12, and any associated helper applications. Exemplary data processing resources that may be used to host the query distributors 10 and the web servers 12 include, but are not limited to, personal computers, workstations, mid-range computers or main frame systems. One or more of such resources may be used, and each such resource may be singly- or multiply-partitioned in order to run the required number of instances of query distributor and web server program logic. An exemplary server farm implementation may utilize a first set of one or more data processing resources to host the front end query distributors 10 and a second set of one or more data processing resources to host the back-end web servers 12. The web server helper applications could also run on the second set of data processing resources, or alternatively a third set of one or more data processing resources could be used. A set of dedicated data storage resources, such as one or more single-disk storage units, multi-disk storage subsystems, RAID arrays, JBOD arrays, etc., may be used to host the server storage 14. The forgoing resources of the web server system 6 may be situated at a single physical site or could be distributed over plural sites that are geographically diverse. Although not shown, interconnectivity between such resources may be provided by way of a private network, a public network, or by other communication infrastructures.

The communication medium 8 may be implemented using any suitable communication technology, including wired (e.g., electrical or optical) or wireless networks or other connectivity schemes. Examples of suitable network implementations include, but are not limited to, public networks, such as the Internet, as well as private networks. With respect to the latter category, a private network could comprise its own physical infrastructure, or could be provided by way of virtual private network connections within a public network. Thus, although the term "web" is short for "World Wide Web" (a portion of the global Internet), communication between the web clients $4_1, 4_2 \ldots 4_n$ and the web server 6 is not limited to public networks, and may include the use of private networks or even non-network connections.

The web clients $4_1, 4_2 \ldots 4_n$ may interact with the web server system 6 by exchanging messages according to any suitable web-based request-response protocol. For example, the web clients $4_1, 4_2 \ldots 4_n$ may send request for web pages to the web server system 6 and the latter may return responses that contain formatting instructions and data that the web clients process into graphical web page displays. The requests sent by the clients $4_1, 4_2 \ldots 4_n$ may be formatted in any suitable manner. For example, the client requests may comprise presently known HTML (hypertext Markup Language) URL (Uniform Resource Locator) character strings (also known as web addresses) of the type that are conventionally displayed in a web browser address window. The requests may additionally include data that is to be processed by the web server system 6 when generating responsive web pages. A common example would be form data that users of the web clients $4_1, 4_2 \ldots 4_n$ supply using web page forms. When a user submits such a form, the data entered therein are passed to the web server system 6 (e.g., using conventional GET or POST methods) as part of the request sent by the web client $4_1, 4_2 \ldots 4_n$. The web server system 6 processes the request and returns the appropriate web page response to the client. This response may be formatted using a language such as HTML (HyperText Markup Language) or XML (eXtensible Markup Language) that the web client $4_1, 4_2 \ldots 4_n$ parses and interprets in order to display the web page. As mentioned above, the response from the web sever system 6 may be a static web page retrieved from the server storage 14, or it could be dynamically created, for example, by a web server helper application that processes the data submitted as part of a client request. It should also be understood that the request-response messages exchanged between the web client $4_1, 4_2 \ldots 4_n$ and the web server system 6 may be in an open web text format or they may be encrypted according to an encryption mechanism such as SSL/TLS (Secure Socket Layer/Transport Layer Security).

In order to facilitate online transaction processing, the web server system 6 has the ability to track sessions between it and the web clients $4_1, 4_2 \ldots 4_n$. As is known in the art, sessions may be identified by the web server system 6 using any unique identifying information, such as a client name and/or password (assuming the transaction uses such identifiers), a cookie set by the web server system 6, a client network or MAC address, or other distinguishing information. Note that some or all of the foregoing information may be available depending on whether the transaction involves a login process, and if so, the type of login used. For example, a transaction might utilize a formal login process where a user supplies a name and/or password, or an informal login process where the web server system sets a cookie or other identifier on the web client $4_1, 4_2 \ldots 4_n$, perhaps in response to a user selecting a check box or the like indicating that they wish to be remembered. In the former case, user name and password information would be available to the web server system 6 to use as a session identifier. In the latter case, there may not be any user name or password, but there may be a cookie or the like that could be used as a session identifier. A session refers to a series of request-response interactions between the web server and an individual web client $4_1, 4_2 \ldots 4_n$. A common example of an online transaction processing session would be a request-response sequence that entails a web client user filling in and submitting a set of web forms that are generated by the web server system 6, typically in response to data supplied by the user. An online banking transaction that sequentially requests a user name, a password, an account number, a set of transaction instructions, and so on, would be a representative example of a single session. Another example of a session would be a shopping cart transaction wherein a web client user selects items for purchase, places them in a shopping cart, and then purchases the items as part of a check out procedure. Still another example would be a transaction whereby a web client user interacts with a web interface to a hardware or software service, such as a storage or database management system. In this example, the user would use a series of web forms to enter a sequence of interface commands to invoke the functionality of the service.

As discussed by way of background above, in conventional web-based applications there are session timeouts or other automated functions that close a web application session for security reasons if the timeouts or other functions are triggered. Sessions may also be terminated when network errors, equipment failures disrupt the client/server communication link. When such events occur, the session state is lost and the user has to reacquire the interface and start from the beginning of the transaction. Conventional web-based applications also provide no mechanism whereby a user can voluntarily interrupt a session while preserving the session state. For example, when a user logs on to a financial institution website to make an online bill payment, the user must complete the transaction before logging off. The user is not allowed to save the current state of the transaction, logoff and then at some later date, log back into the system and continue with the transaction from the saved point.

To address this problem, a session state manager 16 may be provided that empowers a user to preserve session state (context) notwithstanding a session interruption. As shown in FIG. 1, the session state manager 16 includes a filter 18 that may be configured to intercept client requests and/or server responses passing between the front end distributors 10 and the web servers 12. Assuming the session state manager 16 is in active mode, the filter stores session information within each request and/or each response in a cache storage 20 in order to preserve the session information for subsequent use in recreating the session state. The cache storage 20 may physically reside with the session state manager 16 on any suitable data processing host, such as one of the data processing resources associated with the web server system 6, or otherwise (see below). In the event that a request or a response is encrypted (e.g., using SSL/TLS encryption), the portion thereof to be cached may be decrypted prior to filtering. This decryption may be performed by the front end 10, the web servers 12, or by the filter 18 itself.

FIG. 1 illustrates exemplary pathways 22 and 24 that may be used for passing client requests and/or server responses through the filter 18. As incoming client requests are routed from the query distributors 10 to the web servers 12, they may be diverted to the filter 18 via the pathway 22. The filter 18 may be programmed to cache the session information, either by copying the entire request message or a subset of the information therein to the cache storage 20. In certain embodiments, filter 18 may optionally overwrite any previous cached information for the session in order to preserve memory. After caching, the requests are passed via the pathway 24 to the appropriate web servers 12 for processing. In the reverse direction, outgoing responses sent by the web servers 12 to the query distributors may be diverted to the filter 18 via the pathway 24. Again, the filter 18 may be programmed to cache the session information, either by copying the entire response message or a subset of the information therein to the cache storage 20. In certain embodiments, filter 18 may optionally overwrite any previous cached information for the session in order to preserve memory. After caching, the responses are passed via the pathway 22 to the query distributors 10 for transmission to the web clients $4_1, 4_2 \ldots 4_n$. In this way, session information such as the current web page, login status, wizard step, input field data, etc, may be tracked by the session state manager 16 during the interactive session. In order to properly associate the cached session information with the correct web client $4_1, 4_2 \ldots 4_n$, additional session-identifying information, such as a client name and/or password, a cookie set by the web server system 6, a client network or MAC address, or other unique distinguishing information, may also be cached.

In the event of a session interruption, the cached session information representing the most recent request or response, together with the associated session-identifying information (e.g., the network address of the web client $4_1, 4_2 \ldots 4_n$), may be committed to persistent storage so that the session context can be restored at a later date. The persistent storage can be provided by any suitable storage system. For example, the persistent storage could be implemented as file system storage or database storage associated with either the web server system 6 (e.g., the server storage 14) or the web clients $4_1, 4_2 \ldots 4_n$ (e.g., local disk drives). Alternatively, a storage that is dedicated to the session state manager 16 may be used, such as a file system storage associated with a data processing host that implements the session state manager (see below), or a separate database storage system that is accessible by the session state manager. Any suitable storage format may be used, including BLOBs (Binary Large Objects) or other data types.

Session interruptions resulting in the transfer of cached information to persistent storage may arise under various circumstances, for example, when one of the following instances occur:

The user requests to be logged off of the system and to save the current session state for restoration on the next login; or The system automatically logs off the user from the system due to a session timeout or other automated function of the web application; or The session is interrupted due to a network error, an equipment failure, or other condition.

When the user comes back to the session and accesses the web application, the filter 18 may determine from its previously stored session-identifying information that the user has a saved session. The filter 18 may then present the user with the ability to continue the last saved session, or to discard the changes from the last session and begin with a fresh session. If the user requests to continue the previous session, the filter 18 retrieves the saved session information from persistent storage and uses the information to present the user with a web page that is consistent with the previous state. For example, if the last item of cached session information was a client request comprising a URL address with associated web form data, this information will be retrieved by the filter 18 from persistent storage and passed to the web servers 12 via the pathway 24. The request will be processed in conventional fashion and the appropriate response will be generated. Similarly, if the last item of cached session information was a web server response (i.e., a web page), the filter 18 will retrieve the response from persistent storage and pass it to the query distributors 10 via the pathway 22 for return to the associated web client $4_1, 4_2 \ldots 4_n$. The user is thus taken to the exact place the last session was in, including all field inputs, pages, wizard steps, etc. In essence, it is as if the user never left the session as it existed at the time of the previous logout, timeout or other session interruption. Alternatively, if the user requests that the last session be discarded, all information and state data from the previous session may be deleted and the user will be presented with a fresh session as if there was no previous session to be restored. This would be the case if the session state manager 16 was not present or enabled for operation.

Figure 2:
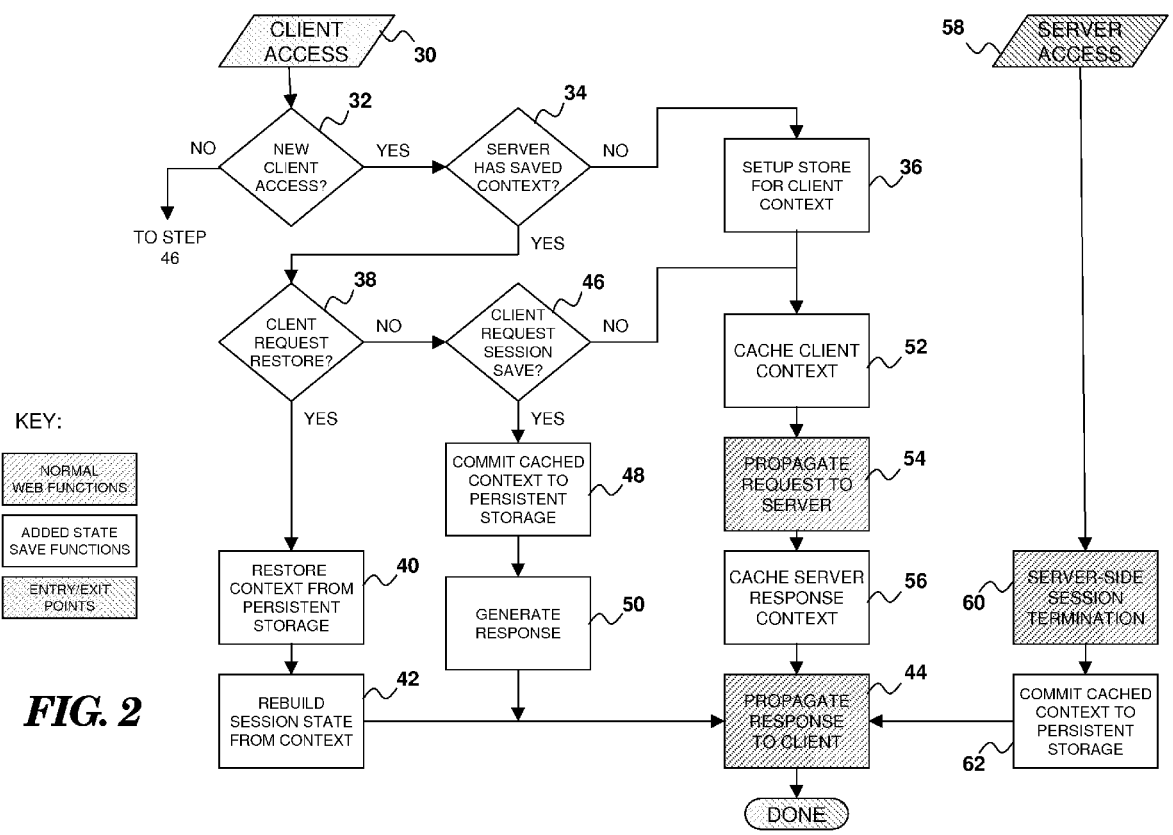
FIG. 2 is a flow diagram showing a sequence of actions performed by the session state manager of FIG. 1.

Turning now to FIG. 2, exemplary logic implemented by the filter 18 of the session state manager 16 is illustrated for the case where the filter saves state on both client requests and server responses (rather than just one or the other). This processing of request-response traffic begins with the receipt of a client request at client access point 30. When the client request is received, control passes to step 32 where the filter 18 tests whether the request represents a new session (new client access). This can be performed by using the client's current session identifying-information (e.g., name, password, cookie, network or MAC address, etc.) as a search key in a lookup of previously cached and/or persistently stored session context information. If true (e.g., a search key match is found), control passes to step 34 in which the filter 18 tests whether there is any saved (cached or persistently stored) session context information for the current web client $4_1$, $4_2 \ldots 4_n$. If the result of step 34 is false, control passes to step 36 in which the filter 18 sets up cache storage for caching session context information associated with the new session. If it is determined in step 34 that there is previously saved session context information, control passes to step 38.

In step 38, the filter 18 tests whether the web client $4_1$, $4_2 \ldots 4_n$ has submitted a request to restore the session context of a saved session. This option may be desirable to a web client user regardless of whether the previous session was automatically terminated by the web server system 6, or voluntarily by the user, or due to a network error, equipment failure or other condition. The user's instructions can be solicited by presenting a web page control element to the web client $4_1$, $4_2 \ldots 4_n$ that allows a user to select whether to proceed with the current session or restore a previous session. The user's selection will be passed as part of the client request so that it may be evaluated by the filter 18 in step 38. If it is determined in step 38 that the web client $4_1$, $4_2 \ldots 4_n$ has requested restoration of a previous session, the session context will be retrieved by the filter 18 from persistent storage in step 40. This can be performed by using the client's current session identifying-information (e.g., name, password, cookie, network or MAC address, etc.) as a search key in a lookup of persistently stored session context information. In step 42, the filter 18 rebuilds the session state in step 42 based on the retrieved context information. This may be handled by the filter 18 alone or with support from the web servers 12. The rebuilt session state will comprise a web page that is propagated to the web client $4_1$, $4_2 \ldots 4_n$, via one of the query distributors 10 in step 44.

If it is determined in step 38 that the web client $4_1$, $4_2 \ldots 4_n$ has not requested a session context restoration, or if it is determined in step 32 that the current request is not the beginning of a new session, control passes to step 46 in which the filter 18 determines whether the client has requested to save the current session. This determination can be made either transparently without user involvement or can be based on user input. In the former case, a user terminating a session before it is completed (e.g., logging out of a transaction prior to consummation) could be interpreted as a client request to save the session context. The user need not know that the session context has been saved until a subsequent login, at which point the user could be asked whether they wish to restore the previous session, as per steps 38-42. If the determination of step 46 is made on the basis of user input, the user's instructions can be solicited by presenting a web page control element to the web client $4_1$, $4_2 \ldots 4_n$ that allows the user to initiate a session save pursuant to a session termination request. If it is determined in step 46 that the web client $4_1$, $4_2 \ldots 4_n$ has requested a session save, the filter 18 will commit the cached context for the current session to persistent storage in step 48. In step 50, the filter 18 generates a session save verification response (e.g., as a web page) and the response is propagated to the web client $4_1$, $4_2 \ldots 4_n$ in step 44.

If it is determined in step 46 that the web client $4_1$, $4_2 \ldots 4_n$ has not requested a session save, control passes to step 52 and the filter 18 caches the current request as session context information. Again, additional session-identifying information (e.g., a name, password, cookie, network or MAC address, etc.) associated with the web client $4_1$, $4_2 \ldots 4_n$, may also be cached in order to facilitate subsequent session restoration on behalf of the correct web client. Step 52 will also be implemented following the cache storage setup operation of step 36. In step 54, the filter 18 propagates the request to the web servers 12 for conventional processing. When a web server response is returned to the filter 18, it is cached in step 56. The response is then propagated to the web client $4_1$, $4_2 \ldots 4_n$, (via one of the query distributors 10) in step 44.

The processing logic of FIG. 2 may be accessed by the web servers 12 at server access point 58 when there is a session termination that is not voluntarily initiated by the web client user. Step 60 represents a server-side termination event in which the web server system 6 either initiates a session timeout or other automated session terminating function, or becomes aware that a session has been interrupted due to some other cause, such as a network error, an equipment failure, or the like. When such an event occurs, the filter 18 is notified so that it may commit the cached session context to the persistent storage in step 62. If there is advance warning of the session termination, an appropriate response may be propagated to the web client $4_1$, $4_2 \ldots 4_n$, (via one of the query distributors 10) in step 44.

Figure 3:
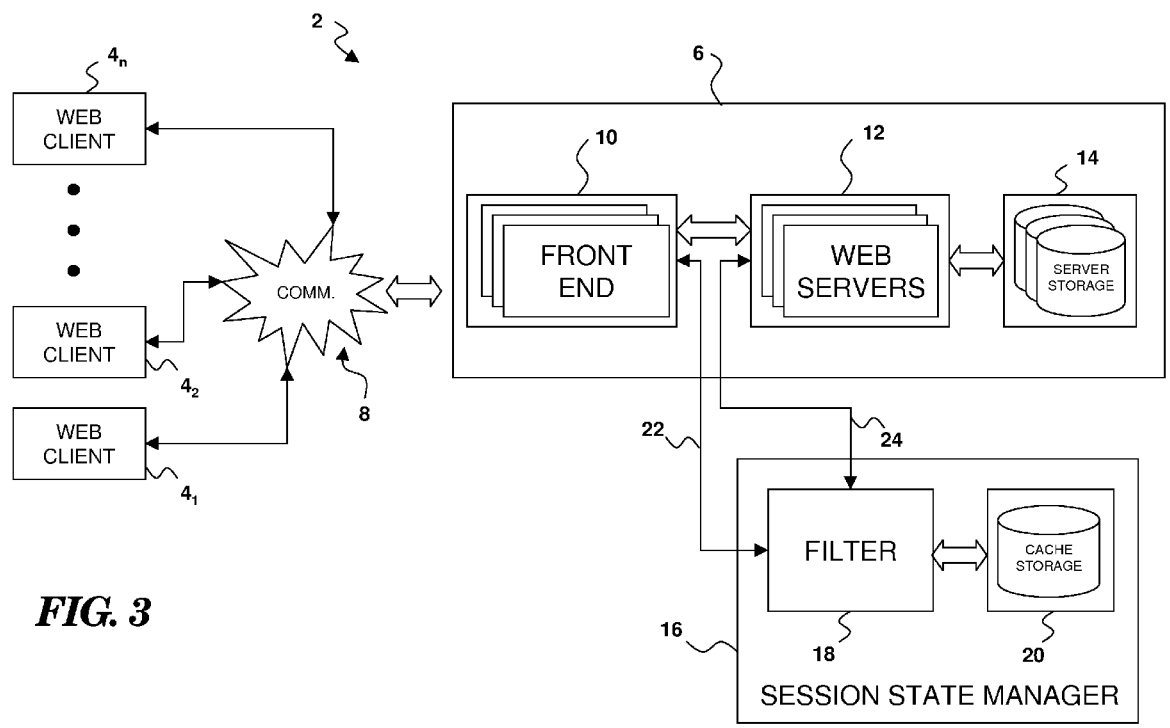
FIG. 3 is a functional block diagram showing an exemplary implementation of the session state manager of FIG. 1.
Figure 4A:
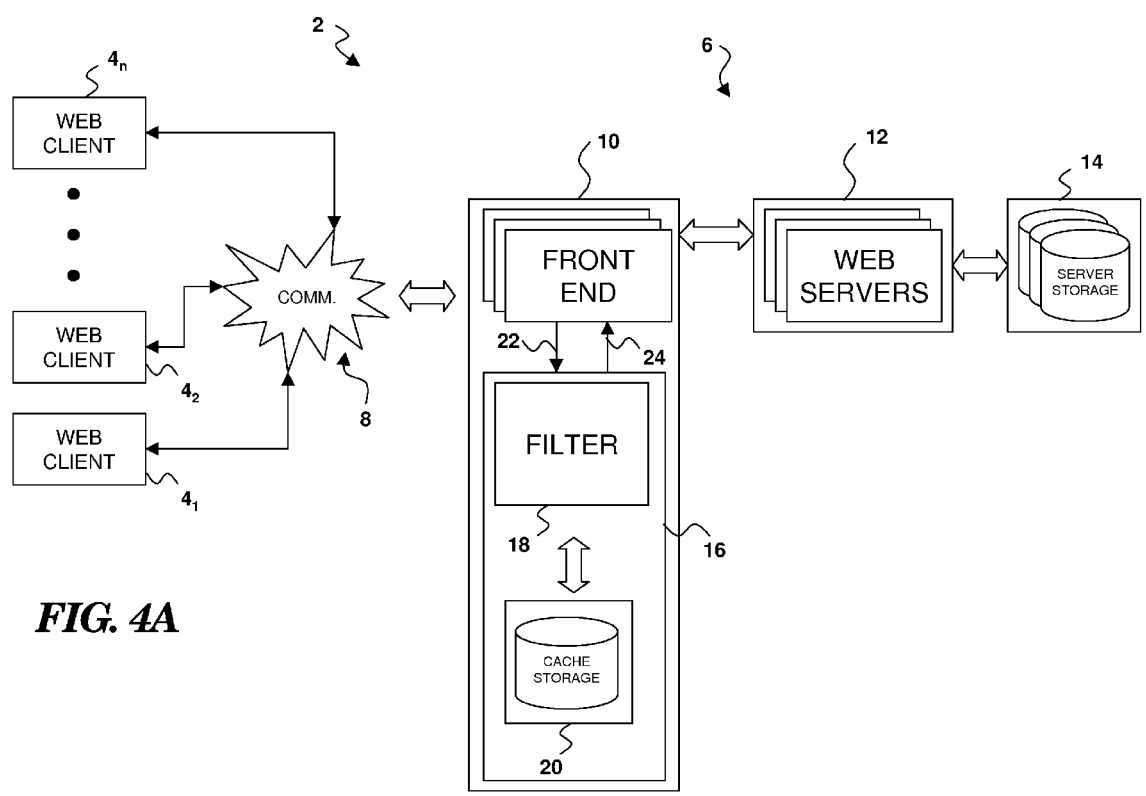
FIG. 4A is a functional block diagram showing a first alternative implementation of the session state manager of FIG. 1.
Figure 4B:
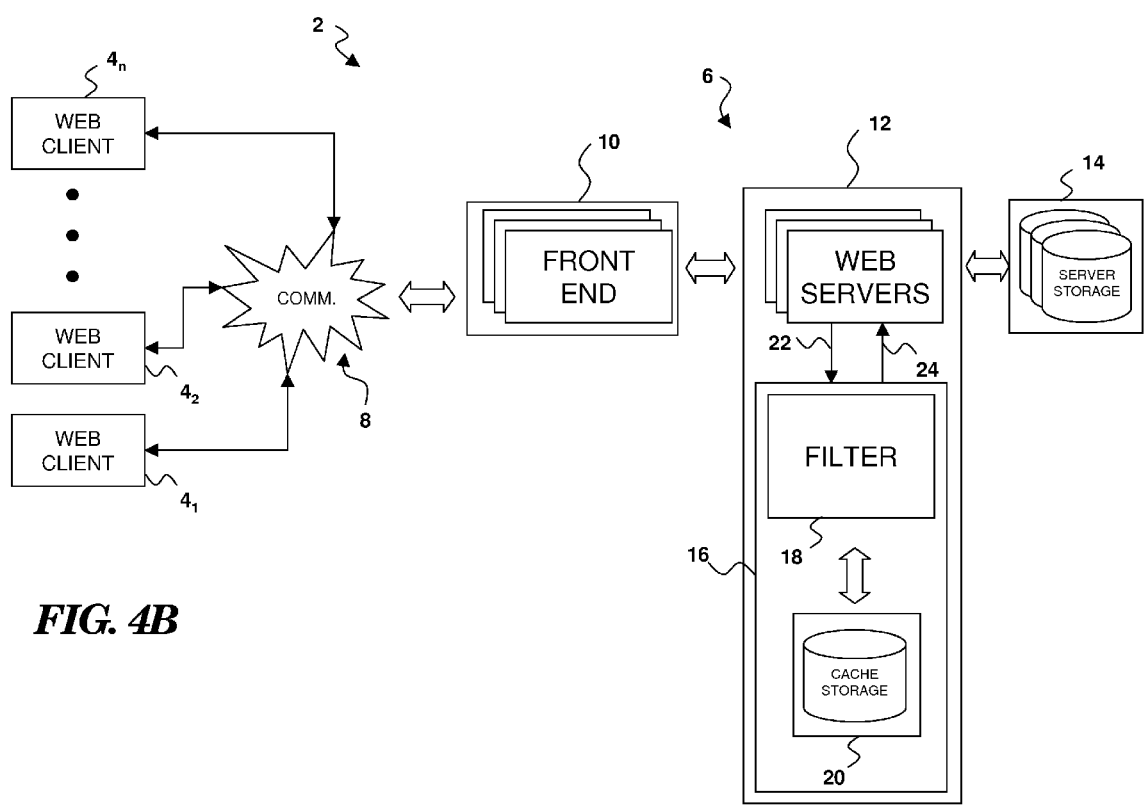
FIG. 4B is a functional block diagram showing a second alternative implementation of the session state manager of FIG. 1.

It will be appreciated that the filter 18 may be implemented as software, firmware or a combination of both. The programming logic that comprises the filter 18 may execute on any suitable data processing system or device. The cache storage 20 may be implemented in a memory associated with the system or device that executes the filter logic. FIG. 3 illustrates one exemplary implementation of the filter 18 wherein its logic is embodied separately from the web server system 6, for example, as a self-contained middleware product. According to this implementation, the filter logic would be distinct from the program logic used to implement the query distributors 10 and the web servers 12. Note, however, that the filter logic could nonetheless execute on the same hardware that runs the query distributors 10 and/or the web servers 12. Alternatively, the filter logic could run on a stand-alone system. In order to handle encrypted messages in the embodiment of FIG. 3 (e.g., based on SSL/TLS or the like), it may be expedient to have the filter 18 handle any decryption of incoming client requests (prior to caching such requests) and encryption of outgoing server responses (after caching such responses). Alternatively, the query distributors 10 could perform decryption/encryption. FIGS. 4A and 4B illustrate another exemplary implementation of the filter 18 wherein its logic is incorporated into the web server system 6. In FIG. 4A, the filter logic is part of the query distributors 10. In order to handle encrypted messages in the embodiment of FIG. 4A (e.g., based on SSL/TLS or the like), it may be expedient to have the query distributors 10 handle any decryption of incoming client requests (prior to caching such requests) and encryption of outgoing server responses (after caching such responses). Alternatively, the filter 18 could perform decryption/encryption as in the embodiment of FIG. 3. In FIG. 4B, the filter logic is part of the web servers 12. In order to handle encrypted messages in the embodiment of FIG. 4B (e.g., based on SSL/TLS or the like), it may be expedient to have the web servers 12 handle any decryption of incoming client requests (prior to caching such requests) and encryption of outgoing server responses (after caching such responses). Alternatively, the filter 18 could perform decryption/encryption as in the embodiment of FIG. 3, as could the query distributors 10.

Figure 5:
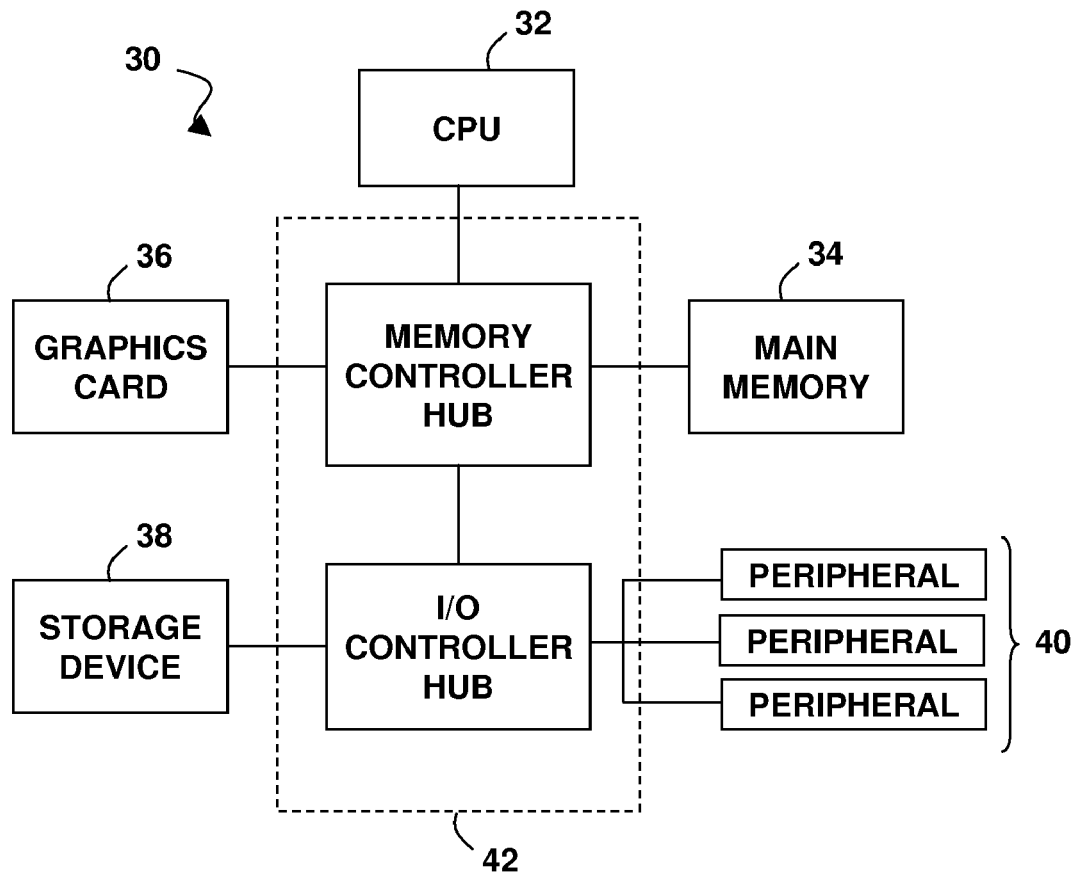
FIG. 5 is a functional block diagram showing an exemplary computer hardware platform that may be used to implement the session state manager of FIG. 1.

Accordingly, a technique has been disclosed for managing the session state of a web application during transaction processing. It will be appreciated that the inventive concepts may be variously embodied in any of a data processing system, a machine implemented method, and a computer program product in which programming logic is provided on one or more data storage media for use in controlling a data processing system to perform the required functions. Relative to a data processing system and machine implemented method, FIG. 5 illustrates an exemplary hardware environment 30 in which the session state manager 16 may be implemented. The hardware environment 30 includes a CPU or other data processing resource 32, a main memory 34, a graphics card 36 for generating visual output to a monitor (not shown), a peripheral storage device 38, other peripheral devices 40, and a bus infrastructure 42 interconnecting the foregoing elements. The session state manager 16 may be loaded in the main memory 34. The cache storage 20 may also reside in the main memory 34. The storage device 38 may be used as persistent storage. Client requests and server responses may be input through an I/O (Input/Output) resource provided by one of the peripheral devices 40, such as a network interface card or other communication device.

Figure 6:
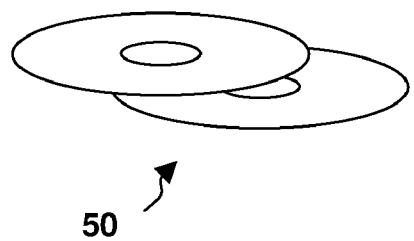
FIG. 6 is a diagrammatic illustration of storage media that can be used to provide a computer program product for implementing the session state manager of FIG. 1.

Relative to a computer program product having a machine-readable media and programming logic, exemplary data storage media for storing the programming logic are shown by reference numeral 50 in FIG. 6. The media 50 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the programming logic of the invention, either alone or in conjunction with another software product that incorporates the required functionality. The programming logic could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical or semiconductor system or apparatus or device, or a network or any other entity that can contain, store or communicate the programming logic for use by or in connection with a data processing system, computer or other instruction execution system, apparatus or device.

While several embodiments of the invention have been shown and described, it should be apparent that many variations and alternative embodiments could be implemented. For example, as previously mentioned, instead of caching both web client requests and web server responses, the filter 18 could be adapted to store only web client requests or only web server responses in order to preserve cache and persistent storage capacity. It is understood, therefore, that the invention is not to be in any way limited except in accordance with the spirit of the appended claims and their equivalents.

What is claimed is:

1. A method for managing the session state of a web application session during transaction processing, comprising:
    receiving a message exchanged between a web client and a web server;
    storing session information in said message on behalf of said client;
    said session information being stored in a cache while said session state remains uninterrupted, and in persistent storage when said session state is interrupted;
    said storing including allowing said client to initiate storage of said session information to said persistent storage when said client voluntarily terminates said session; and
    following an interruption in session state in which a web application session between said client and said server is terminated and said session state is lost, recreating said session state in a new session using said session information.

2. A method in accordance with claim 1 wherein said message comprises one of an encrypted web client request message, a non-encrypted web client message, an encrypted web server response message and a non-encrypted web server response message.

3. A method in accordance with claim 1 wherein said storing of session information comprises storing all of said message.

4. A method in according with claim 1 wherein said persistent storage comprises one of server-side file-system storage, client-side file-system storage, client-side file system storage, or database storage.

5. A method in accordance with claim 1 wherein said session information is stored in association with a session identifier.

6. A system for managing the session state of a web application session during transaction processing, comprising:
    a session state manager filter;
    a storage;
    said filter being adapted to receive a message exchanged between a web client and a web server;
    said filter being further adapted to store session information in said message on behalf of said client in said storage;
    said storing including allowing said client to initiate storage of said session information when said client voluntarily terminates said session; and
    said filter being additionally adapted to recreate said session state in a new session using said session information following an interruption in session state in which a web application session between said client and said server is terminated and said session state is lost.

7. A system in accordance with claim 6 wherein said message comprises one of a non-encrypted web client request message, an encrypted web client message, a non-encrypted web server response message and a non-encrypted web server response message.

8. A system in accordance with claim 6 wherein said filter is adapted to store all of said message in said storage.

9. A system in accordance with claim 6 wherein said filter is adapted to store said session information in a cache while said session state remains uninterrupted, and in persistent storage when said session state is interrupted.

10. A system in accordance with claim 9 wherein said persistent storage comprises one of server-side file system storage, client-side file system storage, or database storage.

11. A system in accordance with claim 6 wherein said filter is adapted to persist said data in association with a session identifier.

12. A computer program product for managing the session state of a web application session during transaction processing, comprising:
one or more machine-readable tangible storage media;
programming logic provided by on said machine-readable media for programming a data processing apparatus to operate as by:
receiving a message exchanged between a web client and a web server;
storing session information in said message on behalf of said client;
said storing including allowing said client to initiate storage of said session information when said client voluntarily terminates said session; and
following an interruption in session state in which a web application session between said client and said server is terminated and said session state is lost, recreating said session state in a new session using said session information.

13. A computer program product in accordance with claim 12 wherein said message comprises one of an encrypted web client request message, a non-encrypted web client request message, an encrypted web server response message and a non-encrypted web server response message.

14. A computer program product in accordance with claim 12 wherein said storing of session information comprises storing all of said message.

15. A computer program product in accordance with claim 12 wherein said session information is persisted in a cache while said session state remains uninterrupted, and in persistent storage when said session state is interrupted.

16. A computer program product in accordance with claim 15 wherein said persistent storage comprises one of server-side file system storage, client-side file system storage, or database storage.

17. A computer program product in accordance with claim 12 wherein said session information is persisted in association with a session identifier.

18. A computer program web server system product for providing a web application on a web server system while managing the session state of the web application session during transaction processing, comprising:
one or more machine readable tangible storage media;
programming logic provided by said machine readable media for programming a data processing apparatus to operate as by:
receiving a request from a client that contains session information for generating a web page;
storing said session information on behalf of said client;
said storing including allowing said client to initiate storage of said session information to said persistent storage when said client voluntarily terminates said session;
processing said request on said web server system; and
following an interruption in session state in which said web application session is terminated and said session state is lost, recreating said session state in a new session by using said stored session information to generate said web page.

19. A computer program product in accordance with claim 18 wherein said storing of session information comprises storing all of said request.

20. A computer program product in accordance with claim 19 wherein said persistent storage comprises one of server-side file system storage, client-side file system storage, or database storage.

21. A computer program product in accordance with claim 18 wherein said session information is stored in a cache while said session state remains uninterrupted, and in persistent storage when said session state is interrupted.

22. A computer program product in accordance with claim 18 wherein said session information is persisted in association with a session identifier.

23. A computer program product in accordance with claim 18 wherein said programming logic is further adapted to control said data processing apparatus to store session information contained in responses from said web server system to said client.

24. A computer program middleware product for supporting a web server system in providing a web application while managing the session state of the web application session during transaction processing, comprising:
one or more machine readable tangible storage media;
programming logic provided by said machine readable media for programming a data processing apparatus to operate as by:
receiving a request from a client that contains session information for generating a web page;
storing said session information on behalf of said client;
said storing including allowing said client to initiate storage of said session information to said persistent storage when said client voluntarily terminates said session;
passing said request to said web server system; and
following an interruption in said session state in which said web application session between said client and said web server system is terminated and said session state is lost, recreating said session state in a new session by providing said stored session information to said web server in order to generate said web page.

25. A computer program product in accordance with claim 24 wherein said storing of session information comprises storing all of said request.

26. A computer program product in accordance with claim 25 wherein said persistent storage comprises one of server-side file system storage, client-side file system storage, or database storage.

27. A computer program product in accordance with claim 24 wherein said session information is stored in a cache while said session state remains uninterrupted, and in persistent storage if said session state is interrupted.

28. A computer program product in accordance with claim 24 wherein said session information is stored in association with a session identifier.

29. A computer program product in accordance with claim 24 wherein said programming logic is further adapted to control said data processing apparatus to store session information contained in responses from said web server system to said client.

* * * * *